April 30, 1963  K. E. WOOD  3,087,523
AGRICULTURAL AND LIKE MACHINE AND ROTOR THEREFOR
Filed April 19, 1961
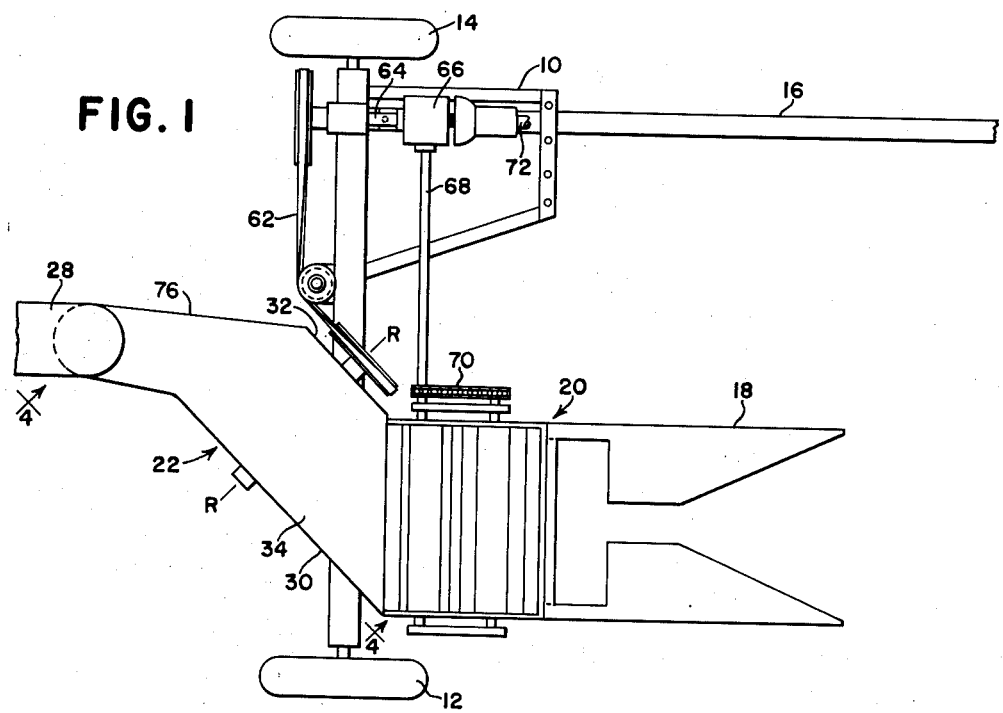
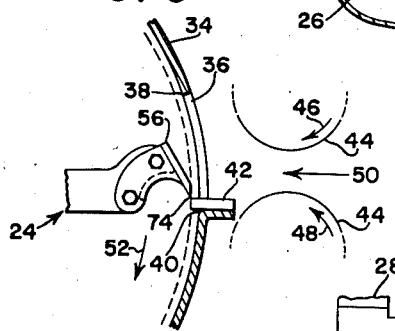
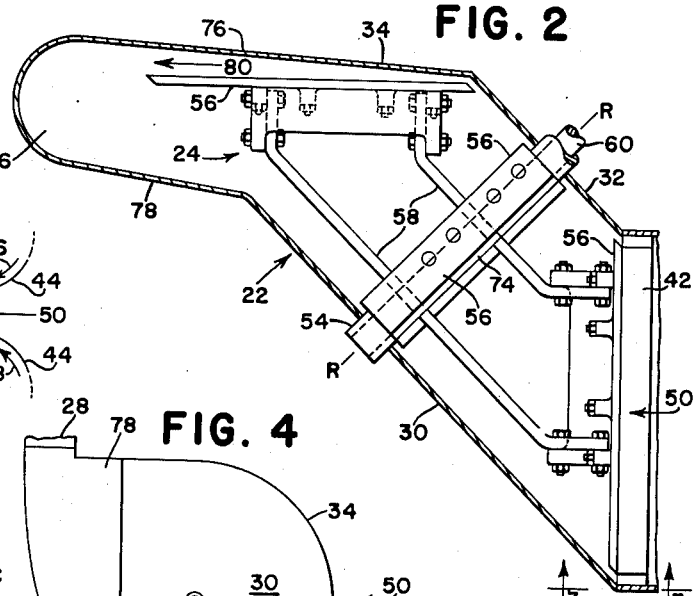
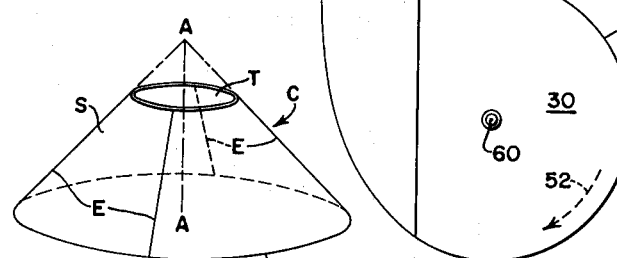
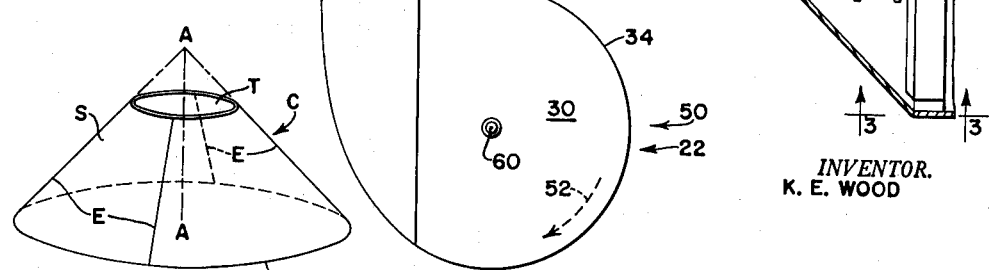
INVENTOR.
K. E. WOOD

United States Patent Office 3,087,523
Patented Apr. 30, 1963

3,087,523
AGRICULTURAL AND LIKE MACHINE AND ROTOR THEREFOR
Keith E. Wood, Ottumwa, Iowa, assignor to Deere & Company, Moline, Ill., a corporation of Delaware
Filed Apr. 19, 1961, Ser. No. 104,154
6 Claims. (Cl. 146—106)

This invention relates to a material-handling machine and rotor therefor and more particularly to such machine as employed in the handling of agricultural crops.

One machine in which the invention finds principal utility is that of the ensilage or forage harvester type, a characteristic of which machine is that it advances over a field of standing crop, for example, cuts the crop from the ground, feeds this crop to reducing means and ultimately transfers the reduced crops to a trailing vehicle such as a wagon or the like towed in tandem with the forage harvester. Machines of this character will include a cutterhead as the principal part of the reducing mechanism, and such cutterhead may be either of the so-called lawn mower type or the flywheel type. In the former, a plurality of circumferentially spaced blades, parallel to or running lengthwise of the axis, cooperate with a shear bar across which the material is fed, and each blade has a substantial area so that it also combines a throwing function to discharge the material, normally upwardly and rearwardly, through a spout attached to the housing which contains the cutterhead. In the case of the flywheel type, the blades are disposed in a common radial plane and cooperate with a shear bar as in the lawn mower type, but in these instances, the flywheel is normally equipped with paddles or the like to accomplish the throwing and blowing function.

According to the present invention, the advantages of both types of cutterheads are combined in a single rotor which here has a central hub means carrying a plurality of cutters or equivalent material-engaging members arranged in uniformly circumferentially spaced relation generally as elements of a right regular truncated cone. The rotor is enclosed in a housing of substantially comparable shape having a discharge outlet through which the reduced or chopped material is thrown by the combined centrifugal forces attributed to rotation of the cutterhead as well as to the tendency of the material to move toward that portion of the cone which has the larger diameter. As an extension of this object, it is another object of the invention to provide such cutterhead in simple and inexpensive form and of a design which may be readily incorporated in basic forage harvesting machines without appreciable changes in the underlying structural basis thereof.

The foregoing and other important objects and desirable features inherent in and encompassed by the invention will become apparent as a preferred embodiment thereof is disclosed in detail in the ensuing description and accompanying sheet of drawings, the figures of which are described below.

FIG. 1 is a top plan view, with portions broken away, of a representative type of forage harvester embodying the invention.

FIG. 2 is a enlarged fragmentary sectional view showing the rotor or cutterhead within its housing.

FIG. 3 is a fragmentary elevation, partly in section, as seen along the line 3—3 of FIG. 2.

FIG. 4 is an elevation, with portions omitted, as seen generally along the line 4—4 of FIG. 1.

FIG. 5 is a perspective view illustrating schematically the conical basis of the construction of the cutterhead and its housing.

The basic machine chosen for purposes of illustration is of the tractor-drawn type comprising a main frame 10 having right and left hand ground wheels 12 and 14 for supporting the machine while it is drawn over the field via connection of its draft tongue 16 to a tractor for example (not shown). At its right hand side, the main frame 10 carries a typical gathering or row unit 18 which, as is well known to those versed in the art, is centered on a row of standing crops. By any well known means, the crops are severed from the ground and are fed rearwardly by feed mechanism 20 into a housing or casing 22 for reduction by a rotor or cutterhead 24 which ultimately discharges the material upwardly and rearwardly via a discharge opening 26 and associated spout 28.

The details of construction of the housing 22 and rotor 24 will be postponed pending reference to FIG. 5, wherein, for purposes of explanation and orientation, there is illustrated a regular cone C having a base B and cut by a truncating plane to leave an upper circular surface T. The complete cone is represented by the additional broken lines extending apexward, and the axis of the cone is represented by the line A—A. The conical surface of the truncated cone is represented by the letter S and this will of course include a plurality of elements such as those designated at E, which are here four in number and 90 degrees apart.

The basic characteristics of the cone in FIG. 5 are utilized in the construction of the housing 22, which will be readily recognized. Therefore, the housing has first and second parallel radial walls 30 and 32, the wall 30 representing the base of the cone and therefore being of larger diameter than the other wall 32. These two walls are coaxial on an axis of rotation R—R, which coincides with the altitude A—A of the cone. The casing further includes a peripheral wall 34 which conforms to the surface of the cone. This peripheral wall is provided in one portion thereof with an inlet opening 36 which is circumferentially spaced from the discharge opening at 26. In the present case, the opening 36 is rectangular, having its upper and lower edges, as at 38 and 40, lying on or parallel to elements of the conical structure. The lower edge 40 of the inlet opening 36 is supplemented by a stationary shear bar 42. The feed mechanism 20 includes a pair of feed rolls 44 which rotate oppositely respectively in the direction of the arrows 46 and 48 to feed material through the inlet opening 36 generally along the path indicated by the arrow 50. The rotor 24 travels in the direction of the arrow 52 (FIGS. 3 and 4) so that ultimately the material is discharged upwardly through the discharge opening or outlet 26 and into the spout 28. Characteristics of the casing structure in the area of the opening 26 will be brought out below.

The rotor 24 has central hub means 54 and a plurality of uniformly circumferentially spaced material-engaging members or cutter means 56 surrounding the hub means and lying generally as four elements of a right rectangular cone somewhat smaller than that which forms the pattern for the casing 22. Each cutter member 56 is generally parallel to the peripheral wall 34 but diverges slightly therefrom toward the discharge opening 26 for purposes to presently appear. The cutters are mounted on the hub means 54 for rotation therewith by means forming the general body of the rotor. In the present case, this means takes the form of a plurality of axially and radially spaced arms 58. The rotor is mounted via its hub means 54 on a driveshaft 60 which is driven by means of appropriate sheaves and a belt 62 from a shaft 64 that extends rearwardly from a gear box 66 mounted at the lefthand side of the frame 10. The gear box includes a lateral shaft 68 which is connected in any suitable manner, as by a chain 70, to drive the feed rolls 44 in their respective opposite directions. The basic input for the gear box 66 is provided by propeller shaft 72 which, as is conventional, may be connected to the power takeoff (not shown) of a tractor (also not shown). These details are fundamental to the present art and need no amplification.

In the present case, the rotor is shown as having four arms, uniformly circumferentially spaced about the axis of rotation R—R. Therefore, the rotor is substantially in balance and rotation thereof in the direction of the arrow 52 causes the knives or cutters 56 to pass successively past the stationary shear bar 42 for chopping material fed across the shear bar in the direction of the arrow 50 by the feed mechanism 20. In this case, each cutter 56 has a leading cutting edge 74 which lies on an element of the cone which forms the pattern of construction for the rotor as such.

As the rotor rotates in the direction indicated, the material cut by the successive knives will be carried downwardly, rearwardly and upwardly, following the path set by the inner surface of the conical peripheral wall 34 of the housing 22. Because of centrifugal force, the material will tend to follow the wall 34 and for this purpose the wall is extended at 76 in a generally tangential manner leading to the opening 26. This requires of course a similar extension, as at 78, on the larger rear wall 30, so that the discharge opening 26 is, at least in part, radially and axially offset from the cone generated by the rotating rotor 24. In addition to the centrifugal force which causes the material to travel tangentially in the area of the wall portions 76 and 78, another component of centrifugal force is at work in the direction of the arrow 80 (FIG. 2), causing additional acceleration of the material toward the discharge outlet. In short, the cut material flows to the larger end of the cone because of centrifugal force in the direction of the arrow 80 and in addition moves because of the centrifugal force resulting from rotation of the rotor, therefore having velocity both radially and axially. This improves the exit of the material from the housing via the spout 28, all without the assistance of complicated paddles and other assisting mechanism.

The structure may be relatively inexpensively manufactured and, as will be clear, may be readily substituted in forage harvesters of basic design. Features and advantages other than those already outlined will readily occur to those versed in the art, as will many modifications and alterations in the preferred embodiment disclosed, all of which may be achieved without departure from the spirit and scope of the invention.

What is claimed is:
1. An agricultural or like machine, comprising: a housing generally in the form of a right regular truncated cone and having a first radial wall representing the base of the cone, a second radial wall of smaller diameter than and coaxial with the first wall on the axis of the cone, and a peripheral wall on the surface of the cone, said peripheral wall having a material inlet opening and a material discharge opening spaced circumferentially from said inlet opening; a rotor coaxially disposed within the housing and having hub means on said axis, a plurality of uniformly circumferentially spaced material engaging members arranged about the hub means and substantially closely surrounded by the peripheral wall, and means mounting the members on the hub means for rotation therewith; and means journalling the rotor in the housing for rotation on said axis for receipt of material by said members at the inlet opening and for discharge of such material at the discharge opening.

2. The invention defined in claim 1, in which: each member is closely parallel to an element of the cone.

3. The invention defined in claim 2, in which: the inlet opening has one edge lying on an element of the cone.

4. The invention defined in claim 3, in which: each member has a cutting edge and said one edge of the inlet opening includes a shear bar with which the member cutting edges are cooperative to cut material received at the inlet opening.

5. The invention defined in claim 1, in which: the discharge opening is located proximate to a portion of the junction between the peripheral wall and the first radial wall.

6. The invention defined in claim 1, in which: the first radial wall and the peripheral wall are radially and axially enlarged in the area of the discharge opening so as to locate at least a portion of said discharge opening radially outwardly of the surface of the cone and axially outwardly of said first radial wall.

References Cited in the file of this patent
UNITED STATES PATENTS

| | | |
|---|---|---|
| 2,651,162 | Whisler | Sept. 8, 1953 |
| 2,709,883 | Pascucci | June 7, 1955 |
| 2,745,237 | Elliot | May 5, 1956 |